(12) United States Patent
Matsumoto et al.

(10) Patent No.: US 9,587,380 B2
(45) Date of Patent: Mar. 7, 2017

(54) DISPLAY DEVICE OF WORK VEHICLE AND DISPLAY METHOD FOR THE SAME

(71) Applicant: Komatsu Ltd., Tokyo (JP)

(72) Inventors: Hayato Matsumoto, Hiratsuka (JP); Mitsuhiro Shimazu, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 521 days.

(21) Appl. No.: 14/344,147

(22) PCT Filed: Nov. 19, 2013

(86) PCT No.: PCT/JP2013/081217
§ 371 (c)(1),
(2) Date: Mar. 11, 2014

(87) PCT Pub. No.: WO2015/025439
PCT Pub. Date: Feb. 26, 2015

(65) Prior Publication Data
US 2016/0258134 A1 Sep. 8, 2016

(51) Int. Cl.
*G06F 19/00* (2011.01)
*E02F 9/26* (2006.01)
(Continued)

(52) U.S. Cl.
CPC ............... *E02F 9/26* (2013.01); *B60R 1/00* (2013.01); *E02F 9/261* (2013.01); *G06F 3/14* (2013.01);
(Continued)

(58) Field of Classification Search
CPC .... E02F 9/26; E02F 9/261; B60R 1/00; B60R 2300/207; B60R 2300/802; G06F 3/14
(Continued)

(56) References Cited

U.S. PATENT DOCUMENTS 7,283,810 B1 * 10/2007 Arakawa ................ G08C 17/02
340/438
7,342,486 B2 * 3/2008 Tsukada .................... E02F 9/26
340/438
(Continued)

FOREIGN PATENT DOCUMENTS

CN 101243230 A 8/2008
CN 202918411 U 5/2013
(Continued)

OTHER PUBLICATIONS

Gabbard et al., Behind the Glass: Driver Challenges and Opportunities for AR Automotive Applications, 2014, IEEE, p. 124-136.*
(Continued)

*Primary Examiner* — McDieunel Marc
(74) *Attorney, Agent, or Firm* — Locke Lord LLP

(57) ABSTRACT

A display device of a work vehicle is configured to alternatively display a plurality of display screens including a first display screen with a video display area and a second display screen without the video display area in accordance with an operation of a screen changeover switch, wherein upon switching from the first display screen to the second display screen for display, a temporary second display screen on which precaution information prompting to switch to and display the first display screen is displayed is displayed.

15 Claims, 6 Drawing Sheets

(51) Int. Cl.
*H04N 7/18* (2006.01)
*B60R 1/00* (2006.01)
*G06F 3/14* (2006.01)
*E02F 3/32* (2006.01)

(52) U.S. Cl.
CPC ........ *H04N 7/183* (2013.01); *B60R 2300/207* (2013.01); *B60R 2300/802* (2013.01); *E02F 3/32* (2013.01)

(58) Field of Classification Search
USPC .......................................................... 701/50
See application file for complete search history.

(56) References Cited

U.S. PATENT DOCUMENTS

| | | | |
|---|---|---|---|
| 7,605,692 B2 | 10/2009 | Yamada et al. | |
| 7,817,021 B2 | 10/2010 | Date et al. | |
| 8,392,075 B2* | 3/2013 | Mindeman | E02F 3/3695 701/50 |
| 8,509,999 B2* | 8/2013 | Suzuki | E02F 9/24 701/50 |
| 8,527,892 B2* | 9/2013 | Sirpal | G06F 1/1616 715/702 |
| 8,773,286 B1* | 7/2014 | Friend | B62D 15/029 340/435 |
| 8,909,387 B2 | 12/2014 | Ikeya | |
| 8,917,292 B2* | 12/2014 | Gotou | B60R 1/00 340/439 |
| 9,315,969 B2* | 4/2016 | Uchiyama | E02F 9/2246 |
| 2001/0050671 A1* | 12/2001 | Ogawa | G06F 3/0238 345/156 |
| 2007/0120660 A1 | 5/2007 | Yamada et al. | |
| 2009/0009308 A1* | 1/2009 | Date | B60R 1/00 340/439 |
| 2010/0091103 A1* | 4/2010 | Peltonen | B02C 21/02 348/82 |
| 2012/0245760 A1 | 9/2012 | Ikeya | |
| 2015/0025753 A1* | 1/2015 | Mori | E02F 9/2066 701/50 |
| 2015/0147147 A1* | 5/2015 | Uchiyama | E02F 3/32 414/687 |
| 2015/0198074 A1* | 7/2015 | Mori | F01N 3/2066 60/286 |
| 2015/0233278 A1* | 8/2015 | Shimazu | F01N 3/18 60/277 |
| 2015/0240454 A1* | 8/2015 | Yogita | F02D 41/22 414/685 |
| 2015/0300232 A1* | 10/2015 | Matsumoto | F02D 41/0235 701/32.6 |
| 2015/0330281 A1* | 11/2015 | Ashitaka | F01P 7/042 123/41.12 |
| 2015/0350296 A1* | 12/2015 | Yang | H04L 67/025 715/740 |
| 2016/0251832 A1* | 9/2016 | Kure | F02D 29/02 |

FOREIGN PATENT DOCUMENTS

| | | |
|---|---|---|
| JP | 2002-275949 A | 9/2002 |
| JP | 2002-293164 A | 10/2002 |
| JP | 2005-163370 A | 6/2005 |
| JP | 2006-096252 A | 4/2006 |
| JP | 2005-118156 A | 10/2009 |
| KR | 10-2011-0077063 A | 7/2011 |
| KR | 10-2012-0093377 A | 8/2012 |
| WO | WO-2007/018021 A1 | 2/2007 |

OTHER PUBLICATIONS

Lu et al., Over-the-horizon Teleoperation System for Underground Unmanned LHD, 2011, IEEE, p. 1804-1809.*
Hu et al., Design and Implementation of the Teleoperation Platform Based on Augmented Reality, 2013, IEEE, p. 126-132.*
International Search Report dated Feb. 18, 2014, issued for PCT/JP2013/081217.

* cited by examiner

DISPLAY DEVICE OF WORK VEHICLE AND DISPLAY METHOD FOR THE SAME

FIELD

The invention relates to a display device of a work vehicle and a display method for the same that can securely bring an operator's attention to the display of a display screen including a video screen during travel or operation of the work vehicle.

BACKGROUND

In a work vehicle such as an excavator, an operator, who is riding in a cab, has a clear view to the front of the cab, and accordingly can easily and visually perceive things such as an obstacle existing in front of the work vehicle. On the other hand, an engine hood, a counterweight, and the like cut the visibility to the side and rear of the cab and accordingly the obstacle and the like may be hard to be visually checked.

Hence, a camera is installed at places such as the rear of an upper swing structure of the work vehicle to make it possible to always display video captured by the camera as a standard screen on a display screen of a display device provided in the cab. Consequently, the operator can check an area having poor visibility through the display screen in cases such as where the work vehicle travels back and where the upper swing structure swings around.

For example, in Patent Literature 1, the camera's rear view image acquired by the camera is displayed on the entire display screen while the camera's image is displayed so as to be seen through a measurement data image by superimposing the measurement data image on the camera's image.

CITATION LIST

Patent Literature

Patent Literature 1: Japanese Patent Publication No. 2005-163370

SUMMARY

Technical Problem

There are cases where a display screen without video captured by the camera and the like is desired to be displayed. Examples of such cases include where things such as the headlight of another vehicle appears on a video screen in the night and the like, and the video screen looks dazzling.

However, if a transition state to the display screen without the video screen is continuously permitted, the operator continues to travel or work only by a visual check and neglects things such as checking to the rear or side of the vehicle without paying attention to them. It is preferred that the operator should check a video screen showing the rear direction and the like together with a visual check during travel or operation of the work vehicle.

The invention has been made considering the above, and an object thereof is to provide a display device of a work vehicle and a display method for the same that can securely bring an operator's attention to the display of a display screen including a video screen during travel or operation of the work vehicle.

Solution to Problem

To solve the problem described above and achieve the object, a display device of a work vehicle according to the present invention is configured to alternatively display a plurality of display screens including a first display screen with a video display area and a second display screen without the video display area in accordance with an operation of a screen changeover switch, wherein upon switching from the first display screen to the second display screen for display, a temporary second display screen on which precaution information prompting to switch to and display the first display screen is displayed is displayed.

Moreover, in the above-described display device of a work vehicle according to the present invention, the temporary second display screen is the second display screen on which the precaution information prompting to switch to and display the first display screen is displayed.

Moreover, in the above-described display device of a work vehicle according to the present invention, upon switching from the first display screen to the second display screen for display, the temporary second display screen is displayed, and upon a predetermined time having been passed since the temporary second display screen was displayed, a switch to the first display screen is automatically performed to display the first display screen.

Moreover, in the above-described display device of a work vehicle according to the present invention, upon a confirmation switch of the precaution information being pressed in a state where the temporary second display screen is being displayed, the second display screen from which the precaution information has been deleted is displayed.

Moreover, in the above-described display device of a work vehicle according to the present invention, upon the screen changeover switch being pressed in the state where the temporary second display screen is being displayed, the first display screen is displayed.

Moreover, in the above-described display device of a work vehicle according to the present invention, upon transitioning from the first display screen to the temporary second display screen, a press of the screen changeover switch causes a transition from the first display screen to a third display screen where the video display area is displayed on the entire screen, and a further press of the screen changeover switch causes a transition from the third display screen to the temporary second display screen.

Moreover, in the above-described display device of a work vehicle according to the present invention, the first display screen is an initial standard display screen to be displayed after a key switch is turned on.

Moreover, a display device of a work vehicle according to the present invention is configured to alternatively display a plurality of display screens including a first display screen with a video display area and a second display screen without the video display area in accordance with an operation of a screen changeover switch, wherein upon transitioning from the first display screen to the second display screen, a press of the screen changeover switch causes a transition from the first display screen to a third display screen where the video display area is displayed on the entire screen, a further press of the screen changeover switch in a state where the third display screen is being displayed causes a transition from the third display screen to a temporary second display screen being the second display screen on which precaution information prompting to switch to and display the first display screen is displayed, upon a confirmation switch of the precaution information being pressed in a state where the temporary second display screen is being displayed, the second display screen from which the precaution information has been deleted is displayed, and upon the screen changeover switch being pressed in the state where the temporary second display screen is being displayed, the first display screen is displayed.

Moreover, a display method for a display device of a work vehicle according to the present invention, the display device being configured to alternatively display a plurality display screens including a first display screen with a video display area and a second display area without the video display area by an operation of a screen changeover switch, includes upon switching from the first display screen to the second display screen for display, displaying a temporary second display screen on which precaution information prompting to switch to and display the first display screen is displayed.

Moreover, in the above-described display method for a display device for a work vehicle, the temporary second display screen is the second display screen on which the precaution information prompting to switch to and display the first display screen is displayed.

Moreover, in the above-described display method for a display device for a work vehicle, upon switching from the first display screen to the second display screen for display, the temporary second display screen is displayed, and upon a predetermined time having been passed since the temporary second display screen was displayed, a switch to the first display screen is automatically performed to display the first display screen.

Moreover, in the above-described display method for a display device for a work vehicle, upon a confirmation switch of the precaution information being pressed in a state where the temporary second display screen is being displayed, the second display screen from which the precaution information has been deleted is displayed.

Moreover, in the above-described display method for a display device for a work vehicle, upon the screen changeover switch being pressed in the state where the temporary second display screen is being displayed, the first display screen is displayed.

Moreover, in the above-described display method for a display device for a work vehicle, upon transitioning from the first display screen to the temporary second display screen, a press of the screen changeover switch causes a transition from the first display screen to a third display screen where the video display area is displayed on the entire screen, and a further press of the screen changeover switch causes a transition from the third display screen to the temporary second display screen.

Moreover, in the above-described display method for a display device for a work vehicle, the first display screen is an initial standard display screen to be displayed after a key switch is turned on.

According to the invention, it is designed such that the temporary second display screen on which precaution information prompting to switch to and display the first display screen is displayed is displayed when the first display screen with the video display area is switched to the second display screen without the video display area to display the second display screen. Accordingly, it is possible to securely bring the operator's attention to the display of the first display screen during travel or operation of the work vehicle.

DESCRIPTION OF EMBODIMENTS

Hereinafter, an embodiment of the invention will be described with reference to the accompanying drawings.

[Entire Configuration of Excavator]

Figure 1:
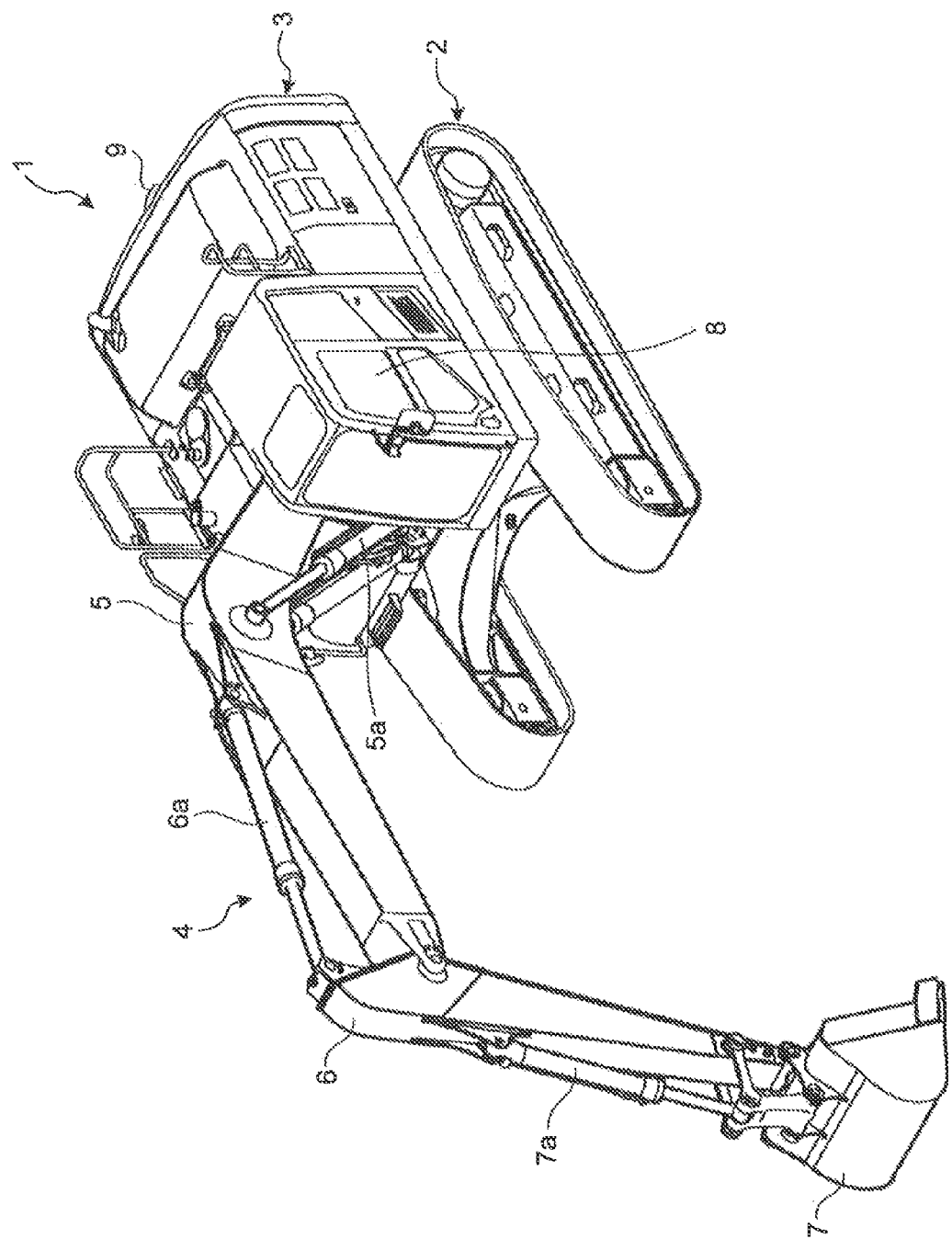
FIG. 1 is a perspective view illustrating an entire configuration of a work vehicle mounting a display device of a work vehicle according to an embodiment of the invention.

FIG. 1 is a perspective view illustrating an entire configuration of a work vehicle mounting a display device of a work vehicle according to an embodiment of the invention. The work vehicle is an excavator 1 illustrated as an example of the work vehicle. The excavator 1 includes an undercarriage 2 including a crawler, an upper swing structure 3 swingably mounted on the top of the undercarriage 2, and work equipment 4 coupled to the upper swing structure 3. The work equipment 4 includes a boom 5 whose base portion is connected to the upper swing structure 3 in an operational manner, an arm 6 that is connected to a distal end of the boom 5 in an operational manner, and a bucket 7 that is connected to a distal end of the arm 6 in an operational manner. Moreover, the upper swing structure 3 includes a cab 8 and the like. Furthermore, a camera 9 that captures a view to the rear of the excavator 1 is provided to the rear of the upper swing structure 3, for example, the top of a counterweight. The camera 9 is an imaging unit that captures an area where an operator who is riding in the cab 8 of the excavator 1 has poor visibility, for example, an area behind the excavator 1. The position and number of cameras 9 installed can be freely selected as needed. Moreover, an after-treatment device such as a particulate matter removal filter (called DPF. DPF: Diesel Particulate Filter) that removes particulate matter (PM: Particulate Matter) included in the exhaust of the engine and a urea SCR (Selective Catalytic Reduction) device that converts nitrogen oxides in the exhaust with a catalyst is provided in an engine room in the rear of the cab 8. Consequently, the capacity of the engine room is increased, the height of the engine room is increased, and the operator's visibility to the rear is reduced. However, the operator can compensate for reduction in the visibility to the rear by a captured rear or side image captured by the camera 9.

[Configuration of Cab]

Figure 2:
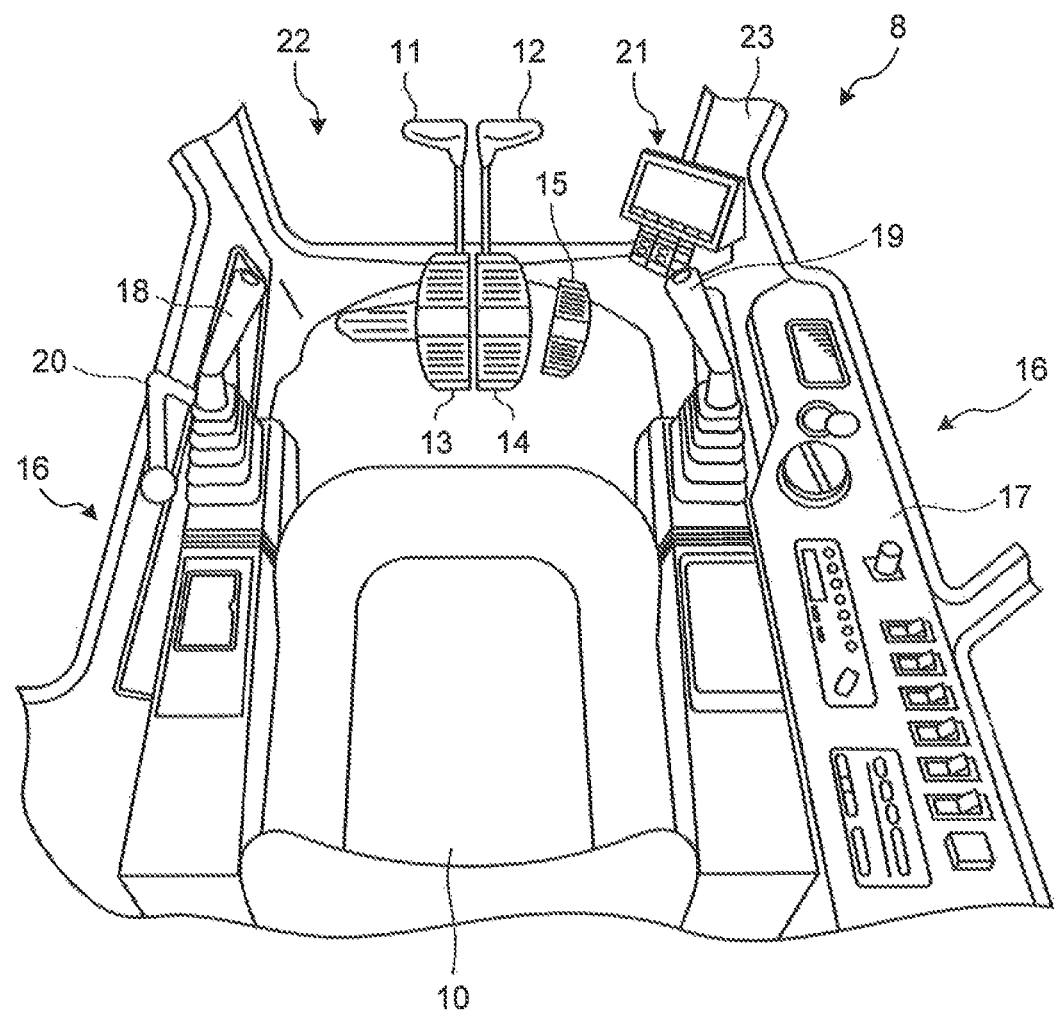
FIG. 2 is a perspective view illustrating an internal configuration of a cab.

FIG. 2 is a perspective view illustrating an internal configuration of the cab 8. The cab 8 is provided with an operator's seat 10 in the center as illustrated in FIG. 2. Travel levers 11 and 12, travel pedals 13 and 14 that operate in an integrated manner with the travel levers 11 and 12 are provided in front of the operator's seat 10. When the operator pushes the travel levers 11 and 12 forward, the undercarriage 2 travels forward. When the operator pulls the travel levers 11 and 12 back, the undercarriage 2 travels back. An attachment pedal 15 is provided in the vicinity of the travel pedals 13 and 14. Moreover, a console 17 is provided in the vicinity of a side window 16 on the right of FIG. 2.

Work equipment levers 18 and 19 are respectively installed on the right and left sides of the operator's seat 10. The work equipment lever 18 is placed to the left as seen from the operator seated in the operator's seat 10. The work equipment lever 19 is placed to the right opposite to the work equipment lever 18. If the work equipment lever 18 is inclined to the right and left in the drawing, it enables the upper swing structure 3 to swing to the right and left. Moreover, if the work equipment lever 18 is inclined to the front and back (up and down) in the drawing, an arm cylinder 6*a* illustrated in FIG. 1 is driven and extended to operate the arm 6 back and forth. On the other hand, if the work equipment lever 19 is inclined to the right and left in the drawing, a bucket cylinder 7*a* illustrated in FIG. 1 is driven to enable the rotation of the bucket 7 around the distal end of the arm 6. Moreover, if the work equipment lever 19 is inclined to the front and back (up and down) in the drawing, a boom cylinder 5*a* illustrated in FIG. 1 is driven to enable lifting up and down of the boom 5. The work equipment lever 18 is inclined obliquely to enable the swing of the upper swing structure 3 and the operation of the arm 6 concurrently. Moreover, the work equipment lever 19 is inclined obliquely to enable the operations of the bucket 7 and the boom 5 concurrently.

Furthermore, a lock lever 20 is provided in the vicinity of the work equipment lever 18. The lock lever 20 is for stopping the functions such as the operation of the work equipment 4, the swing of the upper swing structure 3, and the travel of the undercarriage 2. In other words, an operation of pulling down the lock lever 20 is performed to enable the locking (regulation) of the movements of the work equipment 4 and the like. Even if the operator operates the work equipment levers 18 and 19, and the like in a state where the movements of the work equipment 4 and the like are locked by the lock lever 20, the work equipment 4 and the like do not operate.

A display device 21 that displays various states of the excavator 1 (for example, the temperature of engine coolant, the temperature of hydraulic oil, and the remaining amount of fuel), the camera's rear view video image, and the like is provided at the bottom of a door post 23 that partitions a front window 22 of and the side window 16 on one side of the cab 8.

[Functional Configuration of Control System Including Display Device]

Figure 3:
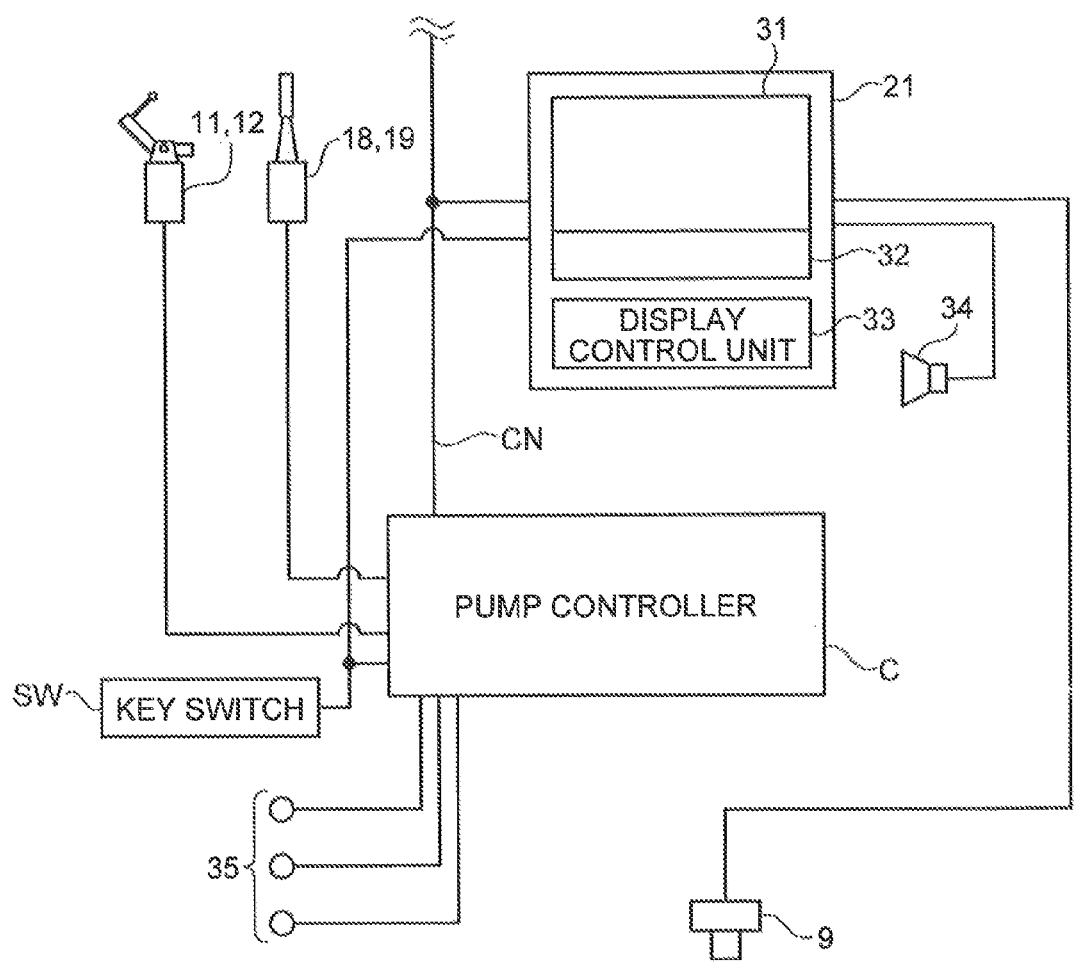
FIG. 3 is a block diagram illustrating a functional configuration of the display device and a configuration of main parts of a control system centering the display device.

FIG. 3 is a block diagram illustrating a functional configuration of the display device 21 and a configuration of main parts of a control system centering the display device 21. The display device 21 includes an input unit 32 into which various instructions or pieces of information are input by a person who operates the excavator such as an operator or a serviceman, a display unit 31 that is realized with a liquid crystal screen and the like and displays various pieces of information including information on the operation of the excavator 1, and a display control unit 33 that is realized with a CPU and the like and controls the state and the like of a screen displayed on the display unit 31 of the display device 21.

The camera 9 is connected to the display device 21. Image processing is performed on a video signal input from the camera 9 by the display control unit 33 and the video signal can be displayed on the display unit 31. Moreover, an alarm buzzer 34 is connected to the display device 21. The alarm buzzer 34 produces an alarm based on a signal output from the display device 21.

A pump controller C, the display device 21, and other unillustrated controllers (an engine controller, an in-vehicle controller, a communication controller, and the like) are connected to an in-vehicle network CN being an in-vehicle LAN (Local Area Network) such as CAN (Controller Area Network), and can mutually exchange information.

Based on the operation amount of the operation levers such as the travel levers 11 and 12 and the work equipment levers 18 and 19, the pump controller C adjusts the flow rate of the hydraulic oil to be discharged from an unillustrated hydraulic pump, and controls the drive of the hydraulic actuators such as the boom cylinder 5*a*, the arm cylinder 6*a*, and the bucket cylinder 7*a*. Sensors 35 are connected to the pump controller C, and information detected by the sensors 35 is transmitted to the display device 21 and other controllers via the pump controller C and the in-vehicle network CN. The pump controller C adjusts the flow rate of the hydraulic oil, for example, by adjusting the swash plate angle of the hydraulic pump. Moreover, the pump controller C monitors the hydraulic oil temperature based on a detected value of a hydraulic oil temperature sensor being one of the sensors 35.

A key switch SW is connected to at least the pump controller C and the display device 21. When the key switch SW is turned on, at least the power to the pump controller C and the display device 21 is turned on.

The unillustrated engine controller connected to the in-vehicle network CN grasps the state of the engine based on engine speed, engine coolant temperature, the remaining amount of fuel, and the like, which are acquired from the sensors 35, and adjusts the injection quantity to control engine output. The unillustrated in-vehicle controller detects, for example, the temperature of an air conditioner in the cab 8 and controls the operation of the air conditioner. Moreover, the unillustrated communication controller detects its own position based on a value from a GSP sensor as one of the sensors 35, and controls to, for example, transmit the own position to the outside via a communication device, and receive communication data from the outside.

Moreover, in FIG. 3, the camera 9 is connected to the display device 21. However, the connection is not limited to this, and the camera 9 may be connected to the pump controller C, other controllers, and the like that are connected to the in-vehicle network CN. In this case, the pump controller C and other controllers themselves may be configured to perform image processing on an imaging signal input from the camera 9 and transmit the image processing result to the display control unit 33 via the in-vehicle network CN or transmit the imaging signal input from the camera 9 as it is to the display control unit 33 via the in-vehicle network CN.

Furthermore, the sensors 35 are connected to the pump controller C, but the connection is not limited to this. The sensors 35 may be connected to the display device 21 and other controllers that are connected to the in-vehicle network CN. Monitoring information such as the detection amounts of the sensors 35 can be displayed on a display screen of the display unit 31.

[External Configuration of Display Device]

Figure 4:
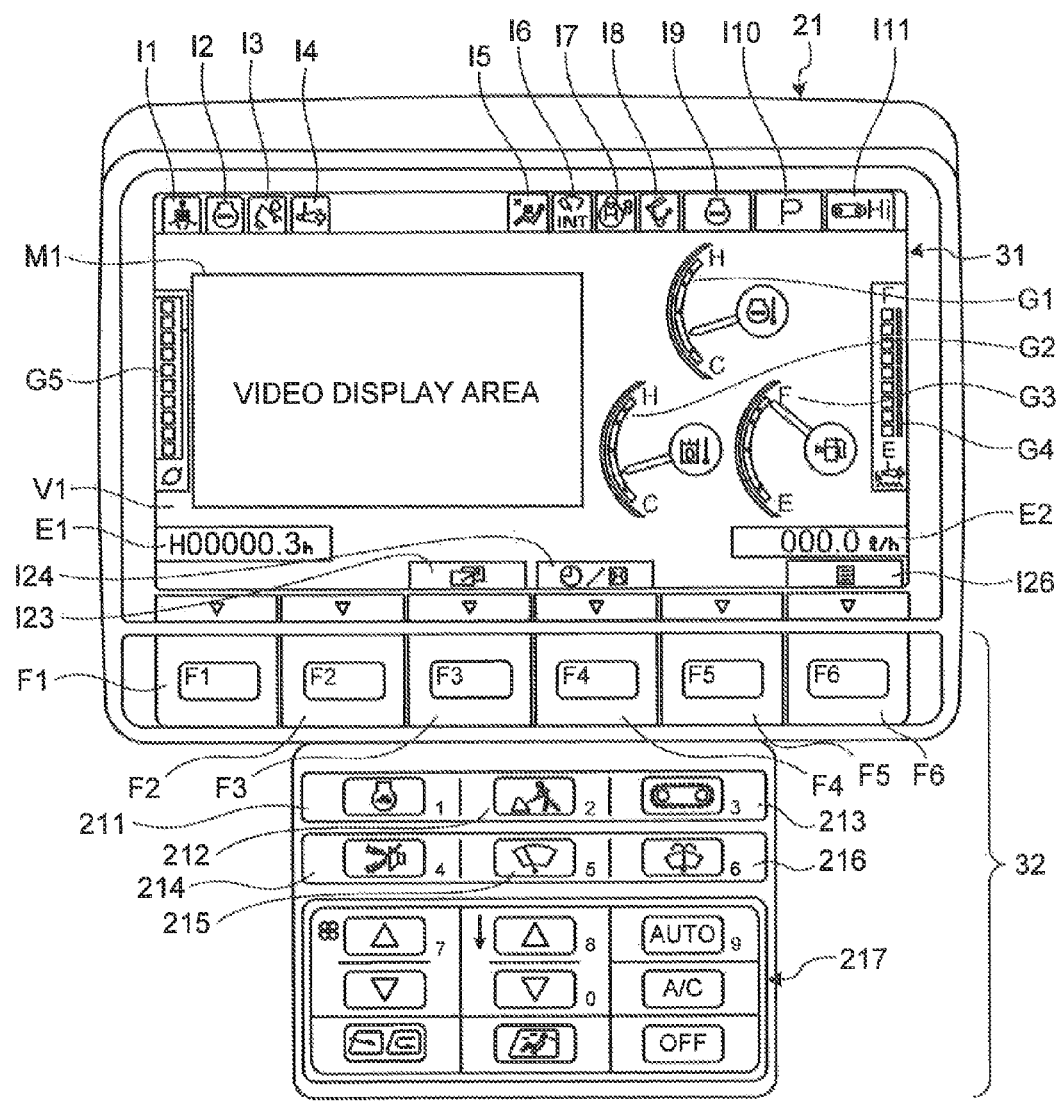
FIG. 4 is a diagram illustrating an external configuration of the display device.

FIG. 4 is a diagram illustrating an external configuration of the display device 21. As illustrated in FIG. 4, the input unit 32 includes a plurality of switches. Among the input unit 32, function switches F1 to F6, which are located at the bottom of the display unit 31 and are respectively represented as "F1" to "F6," are switches for inputting signals corresponding to icons displayed by the display unit 31 above the switches. Below the function switches F1 to F6 are an auto-deceleration switch 211 that allows the execution of auto-deceleration control for reducing the engine speed to a predetermined engine speed when the work equipment levers 18 and 19 return to neutral positions, a working mode select switch 212 for selecting the working mode of the excavator 1 from a plurality of working modes, a travel speed gear select switch 213 for selecting the travel speed gear of the excavator 1 from a plurality of travel speed gear, a buzzer cancel switch 214 for canceling buzzer sounds produced when the excavator 1 falls in a predetermined alarm state, a wiper switch 215 for operating a wiper (not illustrated) provided to a front glass of the cab 8, a washer switch 216 for actuating a washer (not illustrated) that injects wash water to the front glass, and an air-conditioner switch 217 for operating various functions of the air conditioner in the cab 8. A touchscreen of a resistive type or the like can also be applied to the input unit 32. Moreover, the input unit 32 may be configured to be a separate body from the display unit 31. In this case, for example, the input unit 32 may be placed on the console 17.

In FIG. 4, a screen displayed by the display unit 31 is a first display screen V1 being an initial standard screen of when the key switch SW is turned on. A video display area M1 is provided in a left area of the first display screen V1. Video captured by the camera 9 is displayed in the video display area M1. Moreover, an engine water temperature gauge G1 that indicates the temperature of the engine coolant, an hydraulic oil temperature gauge G2 that indicates the temperature of the hydraulic oil in a hydraulic circuit, and a fuel level gauge G3 that indicates the level of the remaining amount of fuel are placed and displayed in a triangular form in a right area of the first display screen V1. Needles of the gauges G1 to G3 oscillates based on detection signals of the sensors 35 corresponding respectively to the gauges G1 to G3. It is sufficient if at least the engine water temperature gauge G1 and the fuel level gauge G3 are displayed on the first display screen V1, and the display of the hydraulic oil temperature gauge G2 is optional.

Moreover, a urea solution level gauge G4 that indicates, in a bar form, the level of the remaining amount of a urea solution that reduces nitrogen oxides in the exhaust into water and nitrogen is displayed in the right of the first display screen V1. On the other hand, a fuel consumption gauge G5 that indicates, in a bar form, for example, an average fuel consumption amount for a predetermined time and an instantaneous fuel consumption amount is displayed in the left of the first display screen V1.

In other words, the video display area M1 and various gauges G1 to G5 are displayed concurrently on the same screen on the first display screen V1. In FIG. 4, the video display area M1 is displayed in the left of the screen, and the engine water temperature gauge G1, the hydraulic oil temperature gauge G2, and the fuel level gauge G3 are displayed in the right of the screen. However, the display may be reversed left-to-right. Moreover, the video display area M1 may be displayed in the center of the screen, and the engine water temperature gauge G1, the hydraulic oil temperature gauge G2, and the fuel level gauge G3 may be displayed while distributed to the right and left of the screen. In this manner, the display of the video display area M1 and various gauges G1 to G3 may be freely laid out. Moreover, the display of the urea solution level gauge G4 and the fuel consumption gauge G5 may also be reversed left-to-right. Furthermore, the display of the urea solution level gauge G4 and the fuel consumption gauge G5 is optional and is not necessarily required.

Furthermore, icons I1 to I4 are displayed in turn from the left in the top left of the first display screen V1. The icon I1 is displayed when a seat belt is not worn. The icon I2 is displayed upon preheating of the engine. The icon I3 is displayed when the lock lever 20 is being locked. The icon I4 displays a regeneration state by the DPF. The icons I1 to I3 are displayed in red and the icon I4 in yellow.

Moreover, icons I5 to I11 are displayed in turn from the left in the top right of the first display screen V1. The icon I5 displays the set state of the air conditioner. The icon I6 displays the set state of the wiper. The icon I7 displays a state of a swing lock. The icon I8 displays the set state of the one-touch power-up. The icon I9 displays the set state of the auto-deceleration. The icon I10 displays the set state of the working mode. The icon I10 is displayed including a character(s) of the mode to be set, "P" of a P mode (power mode), "E" of an E mode (economy mode), "L" of an L mode (arm crane mode=lifting mode), "B" of a B mode (breaker mode), or "ATT" of an ATT mode (attachment mode). In FIG. 4, the P mode is set as the working mode. The icon I11 displays the set state of the travel speed gear. The travel speed gear can be set at low speed, medium speed, and high speed of three kinds. The icon is displayed including "Lo" when set at low speed, "Mi" when set at medium speed, or "Hi" when set at high speed. In FIG. 4, the travel speed gear is set at high speed, and the icon including "Hi" is being displayed.

Furthermore, a service meter/clock display area E1 is provided in the bottom left of the first display screen V1. A service meter being the operating time and a clock are switched and displayed by the operator or the like. In FIG. 4, the service meter is being displayed. Moreover, a fuel gauge display area E2 is provided in the bottom right of the first display screen V1. Numeric values of average fuel consumption for a predetermined time and instantaneous fuel consumption are displayed in the fuel gauge display area E2.

On the other hand, guidance icons I21 to I26 corresponding respectively to the function switches F1 to F6 are displayed in a place at the bottom of the first display screen V1 and above the function switches F1 to F6, as needed. In FIG. 4, the guidance icons I23, I24, and I26 corresponding respectively to the function switches F3, F4, and F6 are being displayed. The guidance icon I23 is an icon meaning to switch a standard screen displayed by the display unit 31. Therefore, the function switch F3 at this point functions as a screen changeover switch. The guidance icon I24 is an icon meaning to switch the display of the service meter/clock display area E1. Whenever the function switch F4 is pressed, the display of the service meter and the clock is switched. Moreover, the guidance icon I26 is an icon meaning to switch the screen displayed by the display unit 31 to an unillustrated user mode screen for performing screen settings such as brightness adjustment and time adjustment.

The user mode screen is displayed by pressing the function switch F6 in a state where the first display screen V1 or a second display screen V2 is being displayed. The user mode screen can transition to a user menu display screen for allowing a general user (the operator who operates the vehicle) to perform settings and the like, and a service menu display screen for allowing a manager to perform settings. "Manager" is, for example, a manager of a construction machine rental company and a serviceman of a distributor of construction machines. Out of them, the transition to the service menu display screen is performed after input of a password unknown to the general user, and execution of a special operation. In this manner, it is desired to be set such that the general user cannot transition to the service menu display screen.

It is possible on the service menu display screen to display menus necessary for the manager to perform fault diagnosis, failure analysis, and the like upon maintenance. Specifically, menus are displayed, such as "monitoring" for displaying a detection result of an item selected from items detected by the sensors 35, a "fault history" for displaying the history of faults, a "maintenance history" for displaying the history of maintenance, a "a maintenance mode setting" for setting the mode upon maintenance, and an "initial value setting" for setting the presence or absence of an option function and initial values of monitoring.

Figure 5:
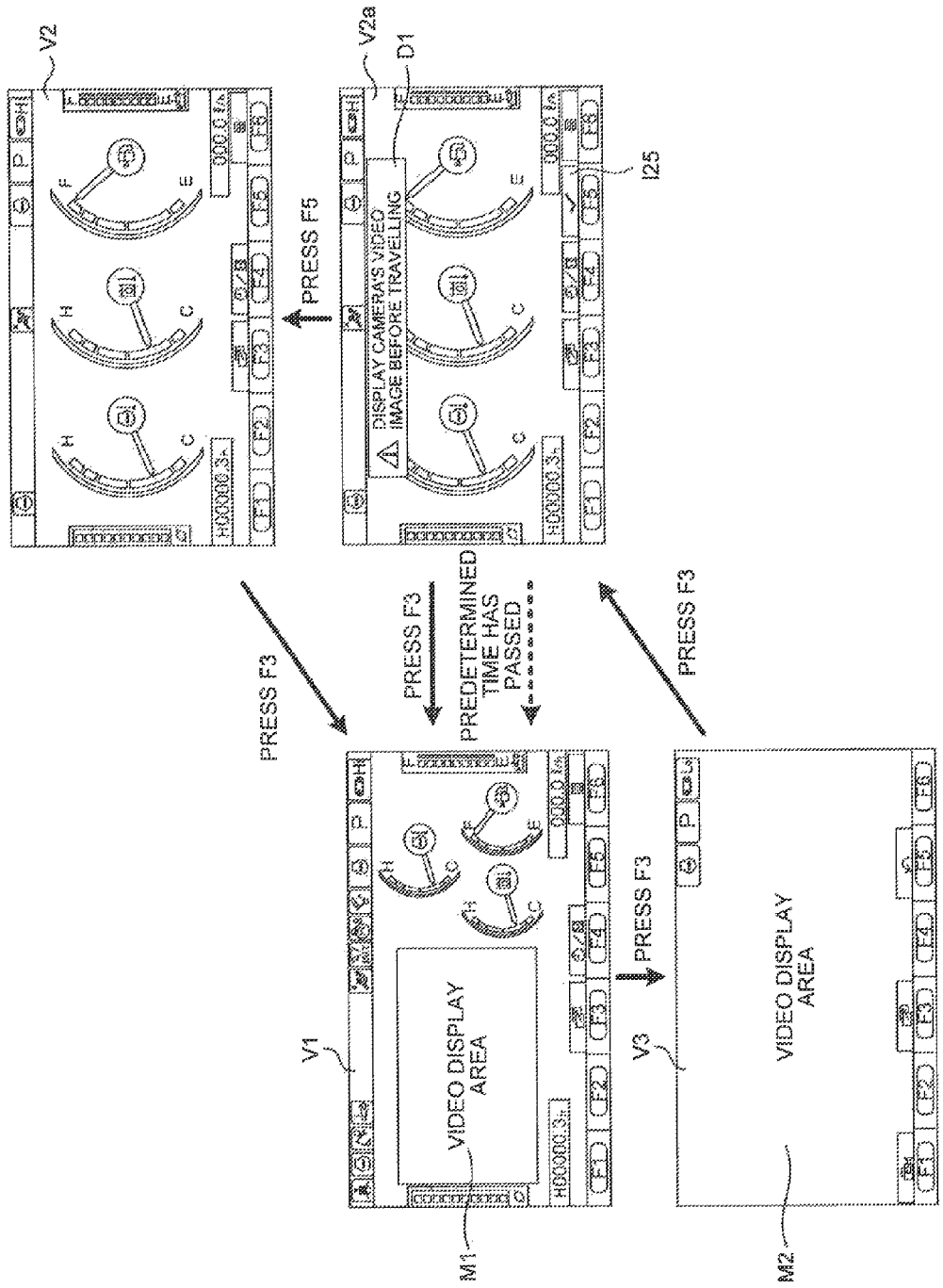
FIG. 5 is a state transition diagram illustrating the display screen transition of standard screens.

The first display screen V1 is one of the standard screens, and is the initial standard screen to be displayed after the turning on of the key switch SW. The other standard screens include the second display screen V2 and a third display screen V3 as illustrated in FIG. 5. On the second display screen V2, the video display area M1 is deleted and the video captured by the camera 9 is hidden. The engine water temperature gauge G1, the hydraulic oil temperature gauge G2, and the fuel level gauge G3 are displayed on the entire display screen of the display unit 31 in a different display state from the display state of the first display screen V1, and displayed larger than the display state of the first display screen V1. For example, as illustrated in FIG. 5, the engine water temperature gauge G1, the hydraulic oil temperature gauge G2, and the fuel level gauge G3 that are being displayed on the second display screen V2 are displayed larger than those displayed on the first display screen V1. In this case, as long as the gauges are displayed large, they may be displayed large side-by-side, or displayed large maintaining the triangular arrangement on the first display screen V1. The arrangement of the gauges is not limited to them. Moreover, the display state of a temporary second display screen V2a to be described below may be designed to be different from the display state of the first display screen V1. For example, as illustrated in FIG. 5, the engine water temperature gauge G1, the hydraulic oil temperature gauge G2, and the fuel level gauge G3 that are being displayed on the temporary second display screen V2a are displayed larger than those displayed on the first display screen V1. Also in this case, as long as the gauges are displayed large, the arrangement of the gauges is not limited to side-by-side, the triangular arrangement, and the like, but can be freely made. Moreover, on the third display screen V3, the engine water temperature gauge G1, the hydraulic oil temperature gauge G2, and the fuel level gauge G3 are hidden and the video captured by the camera 9 is displayed on the entire display screen of the display unit 31.

[Transition Control of Standard Screens]

Figure 6:
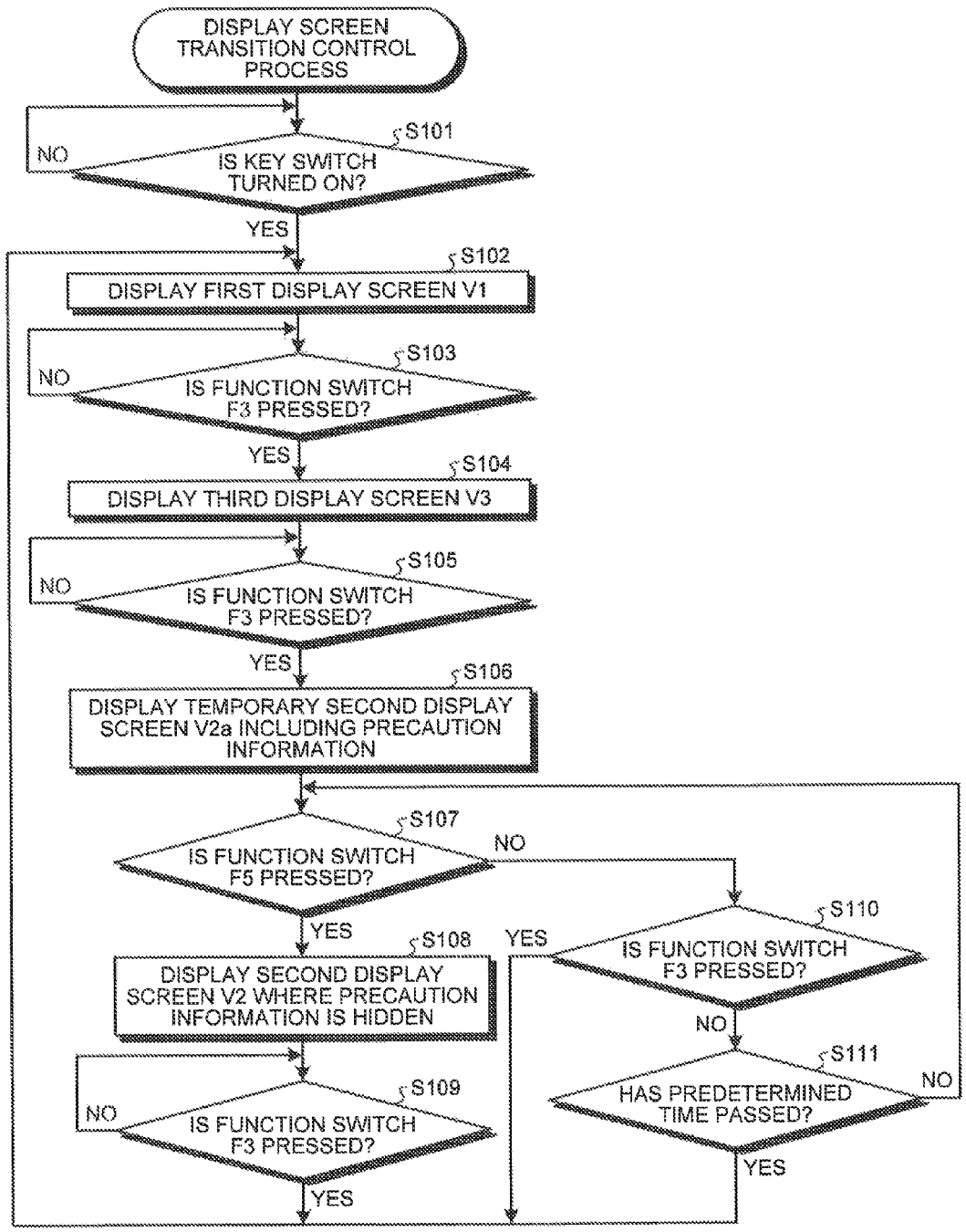
FIG. 6 is a flowchart illustrating a display screen transition control processing procedure of the standard screens by a display control unit.

FIG. 5 is a state transition diagram illustrating the display screen transition of the standard screens. Moreover, FIG. 6 is a flowchart illustrating a display screen transition control processing procedure of the standard screens by the display control unit 33. As illustrated in FIGS. 5 and 6, when the key switch SW is turned on (Step S101, Yes), the first display screen V1 where the video captured by the camera 9 is displayed in the left of the display unit 31 is displayed as the initial standard screen on the display unit 31 (Step S102). When the function switch F3 being the screen changeover switch is subsequently pressed (Step S103, Yes), the third display screen V3 where the video captured by the camera 9 is displayed on a video display screen M2 on the entire display unit 31 is displayed (Step S104).

When the function switch F3 being the screen changeover switch is subsequently pressed in a state where the third display screen V3 is being displayed (Step S105, Yes), the video captured by the camera 9 is hidden, and the second display screen V2 where the engine water temperature gauge G1, the hydraulic oil temperature gauge G2, and the fuel level gauge G3 are displayed on the entire screen of the display unit 31 is displayed, and precaution information D1 is further displayed on the second display screen V2 (Step S106). In other words, the temporary second display screen V2a illustrated in FIG. 5 is displayed. The precaution information D1 contains an exclamation mark and a message that "Display the camera's video image before travelling." In terms of the temporary second display screen V2a illustrated in FIG. 5, the precaution information D1 is displayed on the second display screen V2. However, the temporary second display screen V2a may not display the second display screen V2 but may display only the precaution information D1. In other words, it is sufficient if at least the precaution information D1 is displayed on the temporary second display screen V2a.

Moreover, the message in the precaution information D1 may contain a message content indicating to prompt to display the video not limited to before travelling but before a swing operation and before operation of the work equipment. Furthermore, it is sufficient if the precaution information D1 has a content that prompts to display the video, and the precaution information D1 may be audio output, not limited to display in characters. Moreover, an icon including a check mark is displayed as the guidance icon I25 corresponding to the function switch F5 on the temporary second display screen V2a. Therefore, the function switch F5 functions as a confirmation switch of the precaution information D1 on the temporary second display screen V2a. The precaution information D1 and the guidance icon I25 are highlighted by such things as filling the background with solid yellow, and the like.

When the function switch F5 being the confirmation switch is subsequently pressed in a state where the temporary second display screen V2a is being displayed (Step S107, Yes), the second display screen V2 where the precaution information D1 and the guidance icon I25 are hidden is displayed (Step S108). When the function switch F3 being the screen changeover switch is pressed in a state where the second display screen V2 is being displayed (Step S109, Yes), processing transits to Step S102 to display the first display screen V1, and the above processes are repeated.

On the other hand, when the function switch F5 being the confirmation switch is not pressed in the state where the temporary second display screen V2a is being displayed (Step S107, No), and the function switch F3 being the screen changeover switch is further pressed (Step S110, Yes), processing transits to Step S102 to display the first display screen V1, and the above processes are repeated. In contrast, if the function switch F3 being the screen changeover switch is not pressed (Step S110, No), it is further determined whether or not a predetermined time, for example, 10 seconds, has passed since the temporary second display screen V2a was displayed (Step S111). If the predetermined time has passed (Step S111, Yes), processing transits to Step S102 to display the first display screen V1. On the other hand, if the predetermined time has not passed (Step S111, No), processing transits to Step S107, and the above processes are repeated. If No in the determination processes of Steps S101, S103, S105, and S109, the determination processes of Steps S101, S103, S105, and S109 are repeated.

In other words, as illustrated in FIG. 5, when the function switch F3 is pressed in the state where the first display screen V1 is being displayed, it causes a transition to the third display screen V3. When the function switch F3 is pressed in the state where the third display screen V3 is being displayed, it causes a transition to the temporary second display screen V2a. Furthermore, in the state where the temporary second display screen V2a is being displayed, when the function switch F3 is pressed or when the predetermined time has passed, it causes a transition to the first display screen V1, and when the function switch F5 is pressed, it causes a transition to the second display screen V2. When the function switch F3 is pressed in the state where the second display screen V2 is being displayed, it causes a transition to the first display screen V1.

With the press of the function switch F3 being the screen changeover switch, transitions occur as follows: the display of the first display screen V1→the display of the third display screen V3→the display of the temporary second display screen V2a. However, the display of the first display screen V1 may transition directly to the display of the temporary second display screen V2a not via the display of the third display screen V3. However, it is preferred to display the third display screen V3. In other words, if the third display screen V3 is displayed, when the operator has an intention to drive the excavator 1 in addition to a screen transition intention to transition from the first display screen V1 to the second display screen V2 (the temporary second display screen V2a) without the video display area, the operator definitely sees a large video screen captured by the camera 9, and can always check behind the vehicle whether or not he/she likes it.

Moreover, it is designed in the embodiment to perform a transition via the temporary second display screen V2a when the display of the first display screen V1 transitions to the display of the second display screen V2. In other words, it is designed such that the first display screen V1 with the video display area cannot transition directly to the display of the second display screen V2 without the video display area. The precaution information D1 and the like are displayed on the temporary second display screen V2a. Accordingly, it is possible to securely bring attention to checking to the rear before travelling. Even if the temporary second display screen V2a is a screen that displays only the precaution information D1, it is possible to securely bring attention to checking to the rear.

In other words, the display of the third display screen V3 and the display of the temporary second display screen V2a requires the switch operations, which take time and trouble, to make it possible to bring attention to checking to the rear or side of the vehicle before or during travelling.

Moreover, the transition from the temporary second display screen V2a to the first display screen V1 with the video display area occurs after the predetermined time has passed. Accordingly, the operator can travel or work while being forced to check to the rear or side, not only with a visual check.

It may be designed such that if after the temporary second display screen V2a including only the display of the precaution information D1 is displayed, the function switch F5 being the confirmation switch is pressed to transition to the second display screen V2, then the precaution information D1 is periodically and repeatedly displayed on the second display screen V2. In this case, it is preferred that a display repeating cycle of the precaution information D1 be set to a degree that does not cause trouble in travel and work. Moreover, it may be designed to periodically and repeatedly display the precaution information D1 if the temporary second display screen V2a is for displaying the precaution information D1 on the second display screen V2, or if the temporary second display screen V2a is for displaying only the precaution information D1.

REFERENCE SIGNS LIST

1 Excavator
2 Undercarriage
3 Upper swing structure
4 Work equipment
5 Boom
5a Boom cylinder
6 Arm
6a Arm cylinder
7 Bucket
7a Bucket cylinder
8 Cab
9 Camera
10 Operator's seat
11, 12 Travel lever
13, 14 Travel pedal
15 Attachment pedal
16 Side window
17 Console
18, 19 Work equipment lever
20 Lock lever
21 Display device
22 Front window
23 Door post
31 Display unit
32 Input unit
33 Display control unit
34 Alarm buzzer
35 Sensor
211 Auto-deceleration switch
212 Working mode select switch
213 Travel speed gear select switch
214 Buzzer cancel switch
215 Wiper switch
216 Washer switch
217 Air conditioner switch
C Pump controller
CN In-vehicle network
D1 Precaution information
E1 Service meter/clock display area
E2 Fuel gauge display area
F1 to F6 Function switch
G1 Engine water temperature gauge
G2 Hydraulic oil temperature gauge
G3 Fuel level gauge
G4 Urea solution level gauge
G5 Fuel consumption gauge
I1 to I11 Icon
I21 to I26 Guidance icon
M1, M2 Video display area
SW Key switch
V1 First display screen
V2 Second display screen
V2a Temporary second display screen
V3 Third display screen

The invention claimed is:

1. A display device of a work vehicle configured to alternatively display a plurality of display screens including a first display screen with a video display area and a second display screen without the video display area in accordance with an operation of a screen changeover switch, wherein
upon switching from the first display screen to the second display screen for display, a temporary second display screen on which precaution information prompting to switch to and display the first display screen is displayed is displayed.

2. The display device of a work vehicle according to claim 1, wherein the temporary second display screen is the second display screen on which the precaution information prompting to switch to and display the first display screen is displayed.

3. The display device of a work vehicle according to claim 1, wherein upon switching from the first display screen to the second display screen for display, the temporary second display screen is displayed, and upon a predetermined time having been passed since the temporary second display screen was displayed, a switch to the first display screen is automatically performed to display the first display screen.

4. The display device of a work vehicle according to claim 1, wherein upon a confirmation switch of the precaution information being pressed in a state where the temporary second display screen is being displayed, the second display screen from which the precaution information has been deleted is displayed.

5. The display device of a work vehicle according to claim 1, wherein upon the screen changeover switch being pressed in the state where the temporary second display screen is being displayed, the first display screen is displayed.

6. The display device of a work vehicle according to claim 1, wherein upon transitioning from the first display screen to the temporary second display screen, a press of the screen changeover switch causes a transition from the first display screen to a third display screen where the video display area is displayed on the entire screen, and a further press of the screen changeover switch causes a transition from the third display screen to the temporary second display screen.

7. The display device of a work vehicle according to claim 1, wherein the first display screen is an initial standard display screen to be displayed after a key switch is turned on.

8. A display device of a work vehicle configured to alternatively display a plurality of display screens including a first display screen with a video display area and a second display screen without the video display area in accordance with an operation of a screen changeover switch, wherein
upon transitioning from the first display screen to the second display screen, a press of the screen changeover switch causes a transition from the first display screen to a third display screen where the video display area is displayed on the entire screen,
a further press of the screen changeover switch in a state where the third display screen is being displayed causes a transition from the third display screen to a temporary second display screen being the second display screen on which precaution information prompting to switch to and display the first display screen is displayed,
upon a confirmation switch of the precaution information being pressed in a state where the temporary second display screen is being displayed, the second display screen from which the precaution information has been deleted is displayed, and
upon the screen changeover switch being pressed in the state where the temporary second display screen is being displayed, the first display screen is displayed.

9. A display method for a display device of a work vehicle configured to alternatively display a plurality display screens including a first display screen with a video display area and a second display area without the video display area by an operation of a screen changeover switch, the display method comprising,
upon switching from the first display screen to the second display screen for display, displaying a temporary second display screen on which precaution information prompting to switch to and display the first display screen is displayed.

10. The display method for a display device of a work vehicle according to claim 9, wherein the temporary second display screen is the second display screen on which the precaution information prompting to switch to and display the first display screen is displayed.

11. The display method for a display device of a work vehicle according to claim 9, wherein upon switching from the first display screen to the second display screen for display, the temporary second display screen is displayed, and upon a predetermined time having been passed since the temporary second display screen was displayed, a switch to the first display screen is automatically performed to display the first display screen.

12. The display method for a display device of a work vehicle according to claim 9, wherein upon a confirmation switch of the precaution information being pressed in a state where the temporary second display screen is being displayed, the second display screen from which the precaution information has been deleted is displayed.

13. The display method for a display device of a work vehicle according to claim 9, wherein upon the screen changeover switch being pressed in the state where the temporary second display screen is being displayed, the first display screen is displayed.

14. The display method for a display device of a work vehicle according to claim 9, wherein upon transitioning from the first display screen to the temporary second display screen, a press of the screen changeover switch causes a transition from the first display screen to a third display screen where the video display area is displayed on the entire screen, and a further press of the screen changeover switch causes a transition from the third display screen to the temporary second display screen.

15. The display method for a display device of a work vehicle according to claim 9, wherein the first display screen is an initial standard display screen to be displayed after a key switch is turned on.

\* \* \* \* \*